(12) United States Patent
Yong et al.

(10) Patent No.: US 7,333,680 B2
(45) Date of Patent: Feb. 19, 2008

(54) FIBER BRAGG GRATING SENSOR SYSTEM

(75) Inventors: Jae Chul Yong, Gyeonggi-do (KR); Jae Young Kim, Daejon-si (KR)

(73) Assignee: Fiberpro, Inc., Daejon-Si (KR)

( * ) Notice: Subject to any disclaimer, the term of this patent is extended or adjusted under 35 U.S.C. 154(b) by 0 days.

(21) Appl. No.: 10/570,907

(22) PCT Filed: Sep. 2, 2004

(86) PCT No.: PCT/KR2004/002218

§ 371 (c)(1), (2), (4) Date: Mar. 6, 2006

(87) PCT Pub. No.: WO2005/024349

PCT Pub. Date: Mar. 17, 2005

(65) Prior Publication Data

US 2007/0058897 A1  Mar. 15, 2007

(30) Foreign Application Priority Data

Sep. 8, 2003  (KR) .................. 10-2003-0062591

(51) Int. Cl.
*G02B 6/00* (2006.01)
*G02B 9/02* (2006.01)
*G01N 21/25* (2006.01)

(52) U.S. Cl. .................. 385/12; 385/13; 250/205; 250/227.14; 250/227.23; 356/477; 356/480

(58) Field of Classification Search ................ 356/345, 356/477, 364, 352, 349; 250/227.14–19, 250/227.23, 227.27, 205

See application file for complete search history.

(56) References Cited

U.S. PATENT DOCUMENTS 6,024,488 A  2/2000  Wu et al.

(Continued)

FOREIGN PATENT DOCUMENTS

KR  2001-0016729  3/2001
KR  2002-0035967 A  5/2002

OTHER PUBLICATIONS

Yun, Richardson and Kim; "Interrogation of fiber grating sensor arrays with a wavelength swept fiber laser," Jun. 1, 1998, Optical Society of America; vol. 23, No. 11, pp. 843-845.*

(Continued)

*Primary Examiner*—Brian Healy
*Assistant Examiner*—Guy G Anderson
(74) *Attorney, Agent, or Firm*—Fenwick & West LLP (57) ABSTRACT

The present invention discloses a fiber Bragg grating sensor system. The system according to the present invention comprises a wavelength tunable laser; a coupler for splitting output light from the wavelength tunable laser into two directions; a reference wavelength generating unit for receiving one directional output light from the coupler and for generating reference wave-lengths and an absolute reference wavelength in order to measure real-time wavelengths of the wavelength tunable laser; a fiber Bragg grating array for receiving the other directional output light from the coupler and for reflecting lights at each of the wave-lengths of the grating therein; a fiber grating wavelength sensing unit for measuring the time when each of the reflected lights from the fiber Bragg grating array is detected; a signal processing unit for figuring wavelength variation information with the use of the measured signals from the reference wavelength generating unit and for obtaining each of wavelengths of the detected lights from the fiber grating wavelength sensing unit; and a laser wavelength control feedback unit for applying AC voltage and DC voltage to the wavelength tunable filter in the wavelength tunable laser. Also, polarization dependency in the sensor system can be removed further installing a depolarizer or a polarization scrambler at the output end of the wavelength tunable laser. By applying the present invention, measurement accuracy of the grating sensor system 20 can be improved due to enhanced wavelength stability and suppression of polarization dependency. Therefore, the fiber Bragg grating sensor system based on the present invention would replace conventional structure/construction diagnosis systems.

11 Claims, 5 Drawing Sheets

U.S. PATENT DOCUMENTS

| | | | |
|---|---|---|---|
| 6,097,487 A * | 8/2000 | Kringlebotn et al. | 356/450 |
| 6,204,920 B1 | 3/2001 | Ellerbrock et al. | |
| 6,327,036 B1 | 12/2001 | Bao et al. | |
| 6,363,180 B1 | 3/2002 | Yamate et al. | |
| 6,449,047 B1 | 9/2002 | Bao et al. | |
| 6,571,027 B2 | 5/2003 | Cooper et al. | |
| 6,788,418 B1 * | 9/2004 | Kringlebotn | 356/477 |
| 2006/0126067 A1 * | 6/2006 | Sirat et al. | 356/364 |

OTHER PUBLICATIONS

Kersey, A. D. et al., "Multiplexed Fiber Bragg Grating Strain-Sensor System with a Fiber Fabry-Perot Wavelength Filter," Optical Society of America, Optics Letters, vol. 18, No. 16, pp. 1370-1372, Aug. 15, 1993.

Yun, S. H., et al., "Interrogation of Fiber Grating Sensor Arrays with a Wavelength-Swept Fiber Laser," Optical Society of America, Optics Letters, vol. 23, No. 11, pp. 843-845, Jun. 1, 1998.

PCT Written Opinion of the International Searching Authority, PCT/KR2004/002218, Dec. 21, 2004.

International Search Report (PCT/ISA/210) dated Dec. 21, 2004 for International Application No. PCT/KR2004/002218 (2 pages).

* cited by examiner

FIBER BRAGG GRATING SENSOR SYSTEM

BACKGROUND OF THE INVENTION

1. Field of the Invention

The present invention generally relates to a fiber Bragg grating sensor system. Particularly, it relates to a fiber Bragg grating sensor system, which improves wavelength stability and repeatability of a wavelength tunable laser, and increases system accuracy by removing polarization dependency.

2. Description of the Related Art

A fiber Bragg grating is to induce a periodical modulation of the refractive index in the core of an optical fiber. The fiber grating is characterized in that it reflects only light within a narrow bandwidth (generally, 0.1~1 nm) centered at Bragg wavelength, which meets the Bragg conditions and otherwise transmits. The Bragg wavelength is varied according to a change in temperature of the fiber Bragg grating and stress applied thereto. Thus, many fiber grating sensors have been developed using the above characteristics in order to measure any perturbations in temperature, strain, or stress.

An advantage of these fiber grating sensors is to measure an absolute value of physical properties such as temperature, strain etc. so that the sensors are immune to the electromagnetic interference. Because the optical fiber consists of silica glass ($SiO_2$), they are a small and light electric insulator. Therefore, they can be installed and inserted to a measured object without affecting the function of the object. Moreover, in a fiber itself, light signals can be traveled to a long distance with little loss. Thus, the fiber grating sensors are easy to telemeter.

Another advantage of the fiber grating sensors is easy to multiplex a lot of grating sensors along one or several fibers installed at several places in order to measure simultaneously. That is, it is easy to apply a wavelength-division multiplexing method by designing each of fiber gratings to have a different reflective wavelength with each other in order that each of wavelengths does not overlap under sensor operation. With this method, a function of a quasi-distributed sensor can be carried out by placing each of the sensors at arbitrary positions separated by a few millimeters up to tens of kilometers.

The first proposed method for embodying a fiber Bragg grating sensor system is to measure a fiber grating wavelength with a broadband source, which has a wide linewidth, and a wavelength tunable filter [A. D. Kersey, T. A. Berkoff, and W. W. Morey, "Multiplexed fiber Bragg grating strain-sensor system with a fiber Fabry-Perot wavelength filter", Optics Letters, Vol. 18, pp. 1370-1372, 1993]. The method tunes an applied voltage, thereby changing wavelengths of the tunable filter being at least those of the fiber gratings.

Employing the specific relationship between the applied voltage and the tuning wavelength of the tunable filter, the method measures the wavelengths of the fiber gratings by detecting a driving voltage when peak of fiber grating reflection signals appears.

Another method comprises a wavelength tunable laser used as a light source [S. H. Yun, D. J. Richardson, and B. Y. Kim, "Interrogation of fiber grating sensor arrays with a wavelength-swept fiber laser", Optics Letters, Vol. 23, pp. 843-845, 1998].

First, the method tunes wavelengths of the laser being at least those of the fiber gratings with a wavelength tunable filter as a function of time.

With the specific relationship between scan time and the tuning wavelengths, the method measures the wavelengths of the fiber gratings by detecting the time when peaks of fiber grating reflection signals appear.

However, in the above-described methods, the wavelength of the practically used tunable filter is not varied linearly according to the applied voltage. Also, there is a problem of deteriorating accuracy and repeatability in long-term measurement due to the wavelength drift of the filter caused by hysteresis or temperature change. Moreover, in those methods an error caused by polarization dependency and the solutions thereof are not disclosed.

Accordingly, it was required for a wavelength reference and a compensating method to solve the above-illustrated problem so as to measure the Bragg wavelength with high accuracy and repeatability and the following methods have been developed. In the following, the principle and problems of the methods will be discussed.

Figure 1:
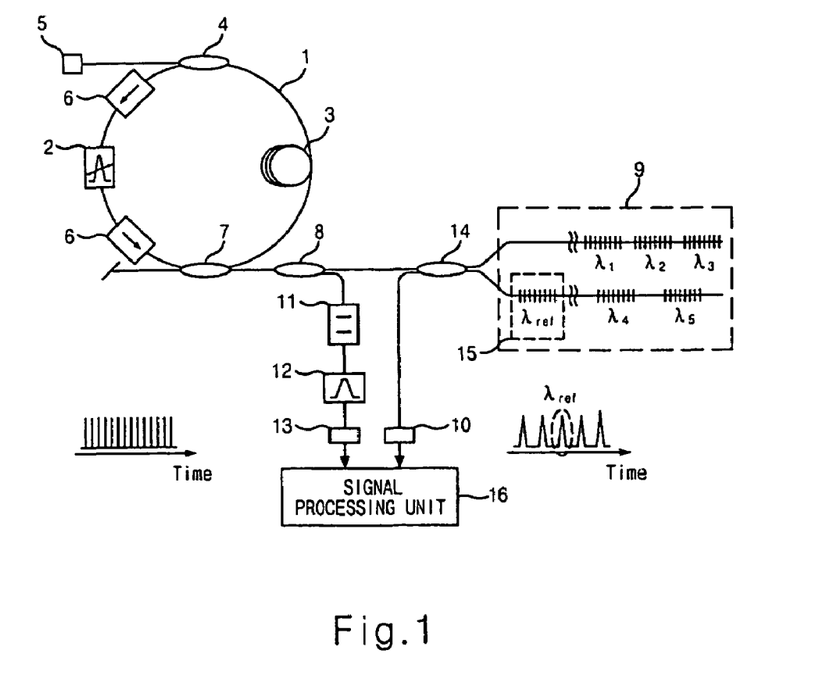
FIGS. 1 through 4 schematically illustrate a fiber Bragg grating sensor system according to the prior art.
Figure 2:
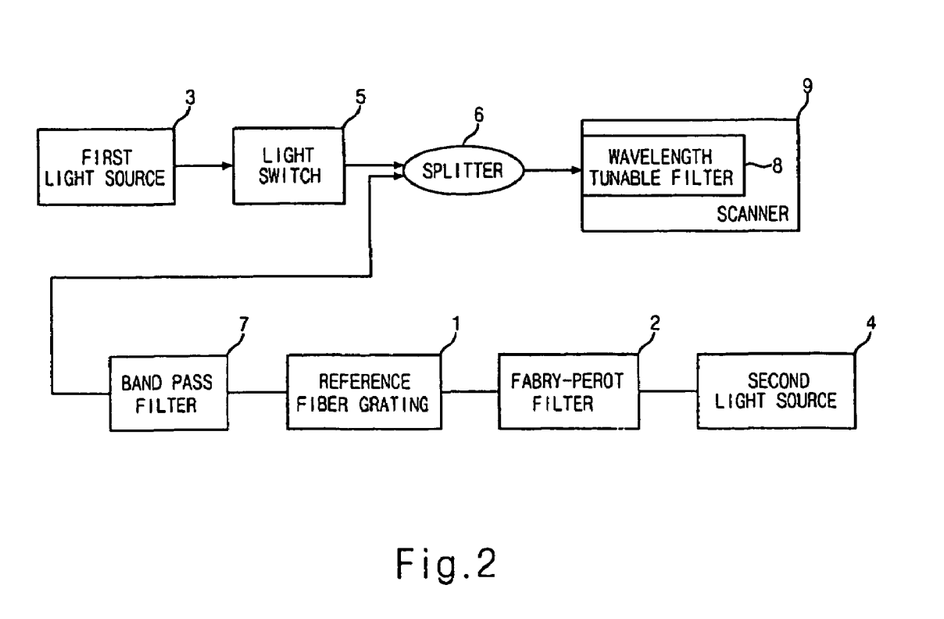
Figure 3:
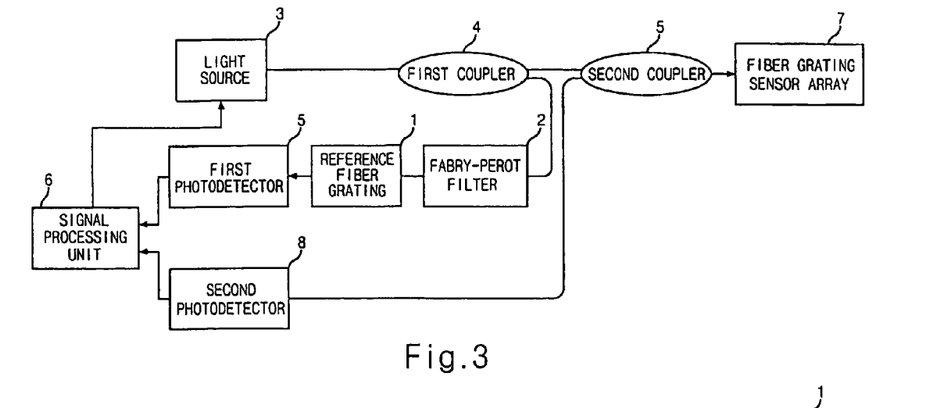

FIGS. 1 through 3 schematically illustrate prior arts for obtaining accuracy of the fiber Bragg grating sensor system. FIG. 1 describes the method disclosed in U.S. Pat. No. 6,097,487 by Kringlebotn et al., FIG. 2 illustrates the method disclosed in U.S. Pat. No. 6,327,036 by Bao et al., and FIG. 3 describes the method disclosed in U.S. Pat. No. 6,449,047 by Bao et al.

Referring to FIG. 1, in the method disclosed in U.S. Pat. No. 6,097,487, a fiber ring laser is used as a light source 1, and wavelength of the laser is changed with a wavelength tunable filter 2 in a laser resonator. A gain medium 3 is pumped by a pumping laser diode 5 via a wavelength-division multiplexer 4. An optical isolator 6 is used for a unidirectional light transmission, for example, only counterclockwise. A laser output of varying wavelength with a narrow linewidth is outputted via a first coupler 7, and then split at a second coupler 8 into two directions. One light from the second coupler 8 is reflected from the fiber grating 9 and the reflected light is directed onto a first photo detector 10, and the other light is transmitted onto a second photo detector 13 via a Fabry-Perot filter 11 and a band pass filter 12. A third coupler 14 is inserted between the second coupler 8 and a fiber-grating array 9. Most of the light from the light source 1 is transmitted onto the fiber-grating array 9 via the third coupler 14, and one of these gratings becomes a reference grating used as an absolute reference wavelength.

Signals detected from the first and second photodetectors 10, 13 are simultaneously sampled, processed, and compared in a signal processing unit 16.

As described above, in this method the Fabry-Perot filter 11 and a reference fiber grating 15 are used for generating a wavelength reference to measure a laser wavelength. Since lights are transmitted via the Fabry-Perot filter 11 only with equally spaced and known frequencies, the frequencies are used as the wavelength reference. That is, a magnitude of the wavelength shift of the laser can be known by measuring output signals of the Fabry-Perot filter 11.

The reference fiber grating 15 is used to calculate an absolute wavelength of the laser. Although relative laser wavelengths can be calculated by the use of the previous output signals of the Fabry-Perot filter 11, the absolute laser wavelength cannot be calculated. Thus, location of reflected peak from the reference fiber grating 15 with the known wavelength is measured and used as the absolute wavelength reference for figuring the absolute laser wavelength of the laser as a function of time.

In brief, it is the method in which the laser wavelength shifts are calculated by the use of the reference fiber grating 15 and the peak signals of the Fabry-Perot filter 11 and thereby measuring the wavelengths of the fiber grating sensors.

However, if the wavelength of the reference fiber grating 15 varies in temperature, etc., the described method is to have an error in measuring the wavelength. Therefore, the reference fiber grating 15 should have temperature stability regardless of the surrounding environments.

Referring to FIG. 2, in the method disclosed in U.S. Pat. No. 6,327,036, the reference fiber grating 1 and the Fabry-Perot filter 2 are used in order to form a reference wavelength as shown in FIG. 1.

However, in this method a wavelength of the reference fiber grating 1 is matched to a specific wavelength transmitted via the Farbry-Perot filter 2, thereby magnifying or diminishing the specific wavelength to distinguish the specific wavelength from the other peak wavelengths. The distinguished specific wavelength is used as the absolute wavelength reference. With this method, a wavelength shift of an input light, i.e. a first light source 3 can have been measured accurately. However, this method has a drawback of requiring an additional light source, i.e. a second light source 4. Also, the method requires a time-divisional technique using an optical switch 5 and a splitter 6 in order to generate a reference wavelength and to measure a wavelength of the first light source 3 alternately. The reference wavelength is generated by introducing a light from the second light source 4 to a wavelength scanner 9 using a wavelength tunable filter 8 via the Fabry-Perot filter 2, the reference fiber grating 1, and a band pass filter 7. Accordingly, in this method, there is a drawback of a limitation in speed for obtaining wavelength information of the input light signal due to generation of the wavelength reference employing the time-division method.

Referring to FIG. 3, in the method disclosed in U.S. Pat. No. 6,449,047, a reference fiber grating 1 and a Fabry-Perot filter 2 are used as shown in FIG. 2 to generate a reference wavelength of a laser, where the wavelength of the reference fiber grating 1 is matched to a specific wavelength transmitted via the Fabry-Perot filter 2. A rapidly wavelength-swept laser as a light source 3 was applied and a wavelength tunable filter, in which voltage would control the transmitted wavelength of the filter to change the wavelength of the laser, was employed. A portion of the laser output is introduced into a first photodetector 5 via a first coupler 4, the Fabry-Perot filter 2, and the reference fiber grating 1 in that order. In a signal processing unit 6, the wavelength of the laser is calculated analyzing signals from the first photodetector 5. Most of the laser output is injected into a fiber grating sensor array 7 via first and second couplers 4, 5 sequentially. The reflected signals from the fiber grating sensor array 7 are directed onto a second photodetector 8, and a wavelength of light reflected from the fiber grating array 7 is calculated in the signal processing unit 6 by comparing these signals with the incident signals on the first photodetector 5. With this method, non-linearity can be removed over the whole wavelength range, and wavelength accuracy of the system can be obtained. Here, the term "accuracy" refers to the difference between the wavelength measured by a sensor system and the true one.

The prior arts illustrated from FIGS. 1 through 3 are related to methods for generating the reference wavelength and continuously monitoring wavelengths of the light source with the reference wavelength, thereby improving wavelength accuracy of the fiber grating sensor system.

However, polarization dependency, one of the essential factors causing accuracy problems in measuring, can be present in the fiber Bragg grating, the Fabry-Perot filter, the photodetector, and so on. Particularly the polarization dependency of the fiber grating in itself can generate significant errors in measuring a change in strain. The polarization dependency of the fiber grating denotes a phenomenon that the wavelength of reflected light varies according to polarization of the incident light to the grating. If the fiber grating has an internal birefringence or a birefringence is induced by an ambience influence such as transverse stress, bending of an optical fiber, and so forth, the phenomenon occurs. In the practical fiber grating sensor system, during a light is transmitted up to tens of kilometers through the optical fiber, polarization states of the light are randomly changed according to perturbations. As a result, the wavelength is changed according to the polarization states, thereby errors occurring in measuring. For solving this problem, there is either a packaging method of the fiber grating not to sustain transverse stress or a method for utilizing polarization-maintaining fibers to preserve the polarization states. However, these methods are expensive and non-effective. Therefore, the following method has been developed to effectively solve this problem.

Figure 4:
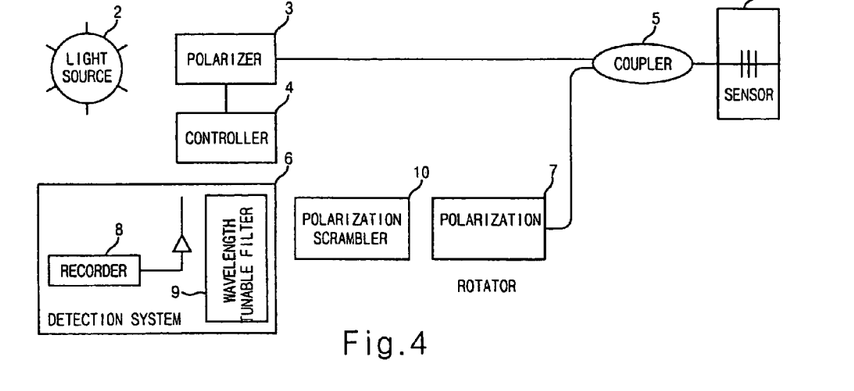

FIG. 4 schematically illustrates a method for stably measuring a change in transverse strain by reducing the polarization dependency, disclosed in U.S. Pat. No. 6,363,180 to Yamate et al.

Referring to FIG. 4, in the method disclosed in U.S. Pat. No. 6,363,180, characteristics that wavelengths of light reflected from the Bragg grating become different from each other according to the polarization of light are employed in measuring a change in transverse strain. If transverse stress is applied to the fiber grating, birefringence is induced, and two reflective peaks according to the birefringence are produced. That is, the two peaks corresponding each of eigen-polarizations are generated, the peak-to-peak separation is proportional to the magnitude of the transverse stress. By the way, if the input polarization states are varied or a detection system for light signals has the polarization dependency, stable signals cannot be obtained in measuring. Therefore, this method has improved the stability of the sensor system either by controlling polarization of a light source 2 being incident to a sensor 1 with a polarizer 3 and a controller 4 or by adjusting the polarization of the light, which is reflected from the sensor 1 and then introduced to a detection system 6 via a coupler 5 with a polarization rotator 7. The detection system 6 includes a recorder 8 and a wavelength tunable filter 9. Since a Fabry-Perot filter for analyzing reflected wavelength from the sensor had polarization dependency, a polarization scrambler 10 was applied to remove this polarization dependency.

However, in case of use of a polarization controller or polarization scrambler, the measurement should be carried out for enough time and the result therefrom should be averaged to remove polarization dependency. Accordingly, the fast polarization scrambler, which may be very expensive and increase insertion loss, is required for fast measurement of strain.

Accordingly, it is noted that problems of the wavelength stability and the polarization dependency should be solved to fabricate the practically useful fiber Bragg grating sensor system.

SUMMARY OF THE INVENTION

The object of the present invention provides a fiber Bragg grating sensor system not only for measuring and calibrating wavelength of a wavelength tunable laser used as a light source but also for actively controlling the wavelength of the light source with the calibration result.

Another object of the present invention provides a fiber Bragg grating sensor system for simultaneously solving polarization dependency caused in measuring a change in strain.

In order to achieve the above-described objects, a fiber Bragg grating sensor system according to the present invention comprises a wavelength tunable laser including a wavelength tunable laser including a wavelength tunable filter for outputting a tunable wavelength light, a first coupler for receiving the light outputted from the wavelength tunable laser and for splitting the light into two directions, a reference wavelength generating unit for receiving one of lights split by the first coupler, for generating reference wavelengths to measure real-time wavelengths of the light outputted from the wavelength tunable laser, and for defining one of the reference wavelengths as an absolute reference wavelength, a fiber Bragg grating array for receiving the other of lights split by the first coupler and for reflecting the lights by each of wavelengths of the grating therein, a fiber grating wavelength sensing unit for measuring times when each of lights reflected from the fiber Bragg grating array is detected, a signal processing unit for receiving times of the reference wavelengths generated from the reference wavelength generating unit and times when lights are detected from the fiber grating wavelength sensing unit, for calculating wavelengths in each time period of light outputted from the wavelength tunable laser, and for calculating wavelengths of the lights detected from the fiber grating wavelength sensing unit, and a laser wavelength control feedback unit for applying AC voltage to the wavelength tunable filter for output wavelength of the wavelength tunable laser to be periodically changed, and for receiving data of the wavelengths in each time period of the wavelength tunable filter from the signal processing unit and for applying DC voltage to the wavelength tunable filter in order that the wavelengths in each time period of the wavelength tunable filter are regularly repeated.

DETAILED DESCRIPTION OF EMBODIMENTS

In the following, preferred embodiments of the present invention will now be described in detail with reference to the accompanying drawings.

Figure 5:
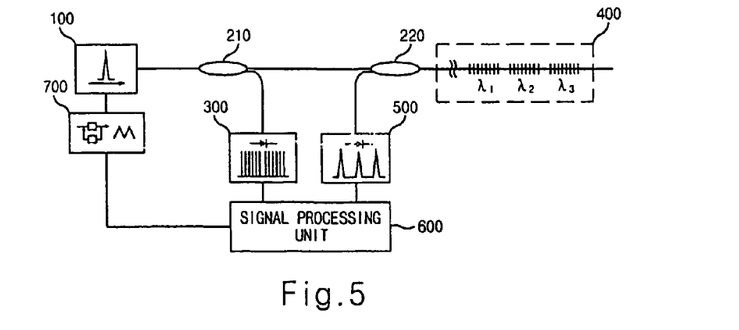
FIGS. 5 through 10 illustrate preferred embodiments according to the present invention.
Figure 6:
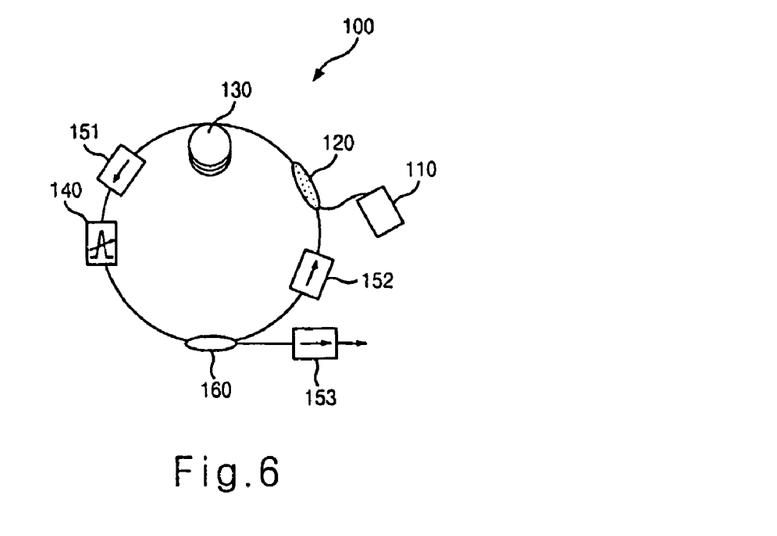
Figure 7:
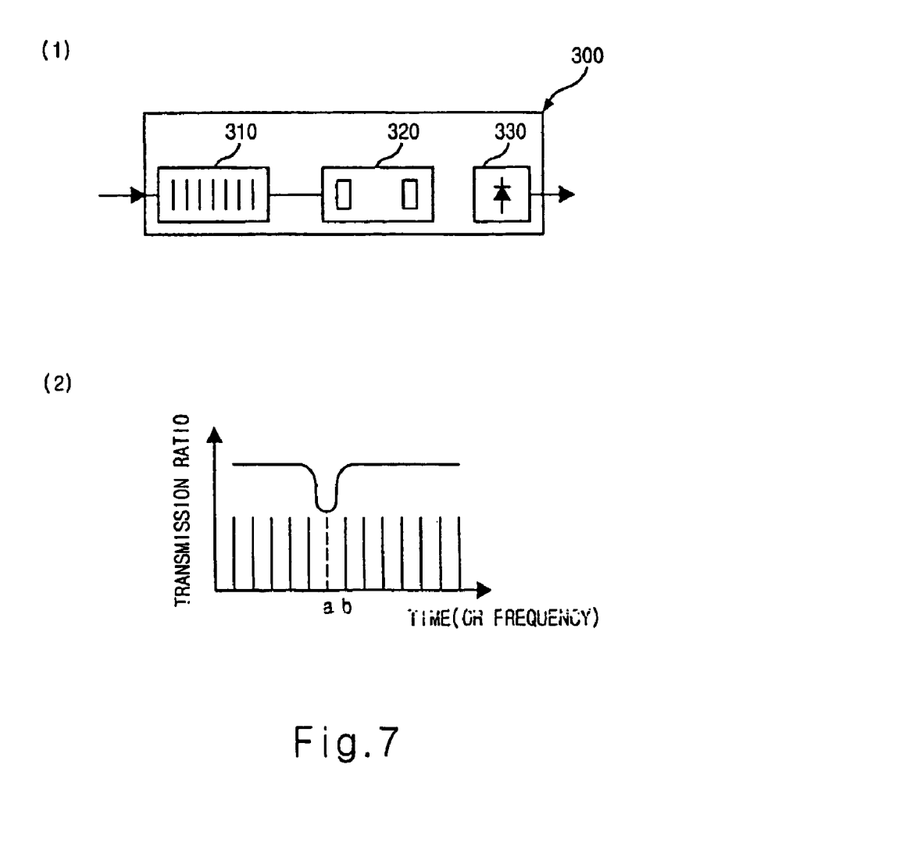
Figure 8:
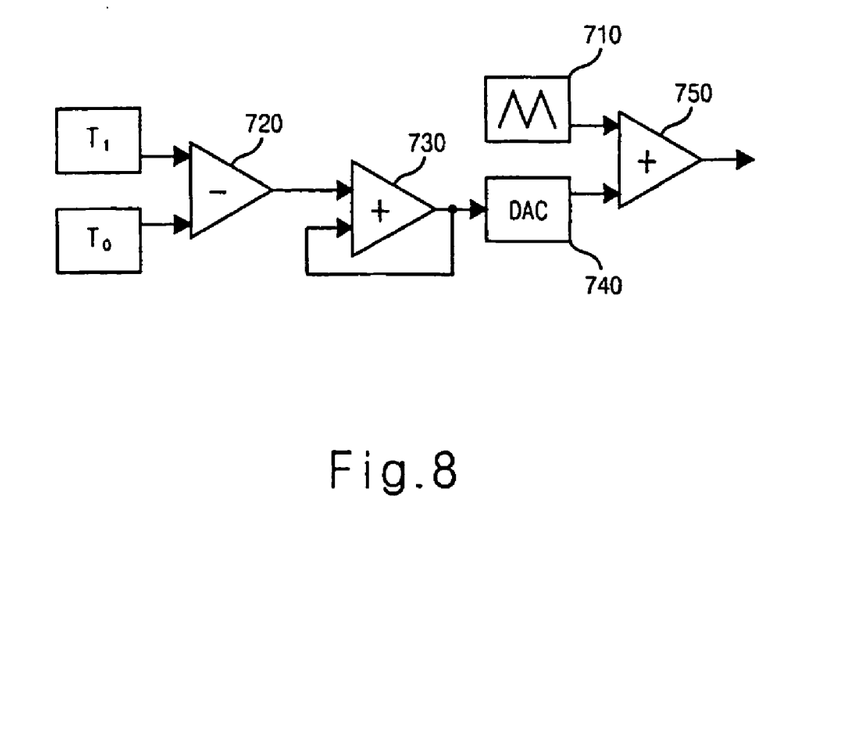

FIG. 5 schematically illustrates the fiber Bragg grating sensor system according to an embodiment of the present invention; FIG. 6 schematically illustrates a wavelength tunable laser in the fiber Bragg grating sensor system according to FIG. 5; FIG. 7 schematically illustrates a reference wavelength generating unit in the fiber Bragg grating sensor system according to FIG. 5; and FIG. 8 schematically illustrates a laser wavelength control feedback unit in the fiber Bragg grating sensor system according to FIG. 5.

Referring to FIG. 5, the fiber Bragg grating sensor system according to an embodiment of the present invention comprises a wavelength tunable laser 100, a reference wavelength generating unit 300, a fiber Bragg grating array 400, a fiber grating wavelength sensing unit 500, a signal processing unit 600, a laser wavelength control feedback unit 700, a first coupler 210 in order to split the light from the wavelength tunable laser 100 into the reference wavelength generating unit 300 and the fiber Bragg grating array 400, and a second coupler 220 for transmitting outputted light from the first coupler 210 into the fiber Bragg grating array 400 and for introducing reflected lights from the fiber Bragg grating array 400 into the fiber grating wavelength sensing unit 500.

Referring to FIGS. 5 and 6, the wavelength tunable laser 100 comprises a laser diode 110 to pump a gain medium, a wavelength-division multiplexer 120 to inject outputted light from the laser diode 110 into the gain medium, an erbium-doped optical fiber 130 used as the gain medium, and a wavelength tunable filter 140 to periodically scan and tune the laser wavelength.

The erbium-doped optical fiber 130 is pumped by the pumping laser diode 110 via the wavelength-division multiplexer 120. Although a forward pumping is shown in FIG. 6, a backward pumping :can be used. Wavelength of the laser is determined by transmitted wavelength of the wavelength tunable filter 140. In this embodiment, a wavelength tunable Fabry-Perot filter is used as a wavelength tunable filter 140 whose transmitted wavelength is varied according to an applied voltage. That is, the wavelength of the laser is tuned by varying the applied voltage with respect to time. To radiate a light unidirectionally, for example, only counter-clockwise, two optical isolators 151 and 152 are used. The laser is outputted through a coupler 160, and the laser output is inhibited from re-entering into a laser resonator by further installing an optical isolator 153 at the output end of the coupler 160 optionally.

A characteristic of this laser output is that its wavelength changes periodically with respect to time. A wavelength tuning range is determined by the erbium-doped optical fiber 130 and the wavelength tunable filter 140 wherein the range is typically at least about 40 nm, for example 1525~1565 nm. If pumping intensity and the frequency and magnitude of the voltage to tune wavelength are properly adjusted, the laser output can be mode-locked. If mode-locked, a laser linewidth of the laser output can be obtained as close as that of the wavelength tunable filter 140, thereby playing an important role of solving polarization dependency of a fiber grating measurement system.

To employ the above-described laser to the practical fiber grating measurement system, wavelength stability should be obtained first. However, transmitted wavelength is drifted by temperature dependency, hysteresis, etc. of a wavelength tunable filter for changing the wavelength of the laser, thereby causing errors to the laser output wavelength. Therefore, it is required for a method for measuring a real-time laser wavelength, and is further required for a feedback method for actively controlling the laser wavelength by employing the real-time measuring result. For these requirements, the reference wavelength generating unit 300, the signal processing unit 600, and the laser wavelength control feedback unit 700 has been used in the present invention. These will be apparent from the following descriptions.

Referring to FIGS. 5 and 7, the reference wavelength generating unit 300 receives one of output lights split by the first coupler 210, and then generates the reference wavelength to measure a real-time wavelength of the wavelength tunable laser 100. The reference wavelength generating unit 300 comprises a reference fiber grating 310 for indicating one of the reference wavelengths as an absolute reference wavelength, a Fabry-Perot filter 320, and a photodetector 330. The reference wavelength is generated as the following.

The Fabry-Perot filter 320 transmits only lights having equally spaced frequencies, and the reference fiber grating 310 reflects only lights having a specific wavelength. Thus, if the laser output with varying wavelength (or frequency) as a function of time is transmitted through the reference fiber grating 310, signals as described in the upper part of FIG. 7(2) are shown. If the laser output is transmitted through the Fabry-Perot filter 320, the reference wavelength as described in the lower part of FIG. 7(2) is shown. At this point, a specific peak is diminished by matching the reflected wavelength of the reference fiber grating 310 with the transmitted wavelength ($\lambda_a$) of the Fabry-Perot filter 320, and the wavelength ($\lambda_b$) of the peak next to the diminished peak is used as the absolute reference wavelength.

Detected signals from the photodetector 330 become the multiple of signals passed through the reference fiber grating 310 and the Fabry-Perot filter 320. When measuring the detected signals of the photodetector 330, it can be known how the laser wavelength is currently varied. That is, the absolute wavelength reference is selected by the use of the reference fiber grating 310, and the laser wavelength at any moment is obtained by interpolating the peak wavelength (or frequency) of the Fabry-Perot filter 320. For calculating the wavelength, the adjacent peaks are interpolated, whereby the narrower frequency (or wavelength) separation between two adjacent peaks is, the fewer errors due to nonlinearity of the wavelength shifts can be. The separation is determined by an etalon gap of the Fabry-Perot filter. This embodiment used 100 GHz (0.8 nm @ 1550 nm) or 50 GHz (0.4 nm @ 1550 nm) as the separation.

However, because in an embodiment of the present invention the reference fiber grating and the Fabry-Perot filter's temperature dependency may also cause errors in wavelength measurement, the packaged reference fiber grating for temperature stability is used to reduce the errors. A reference grating with wide and flat linewidth of the reflected wavelength is used, for example, 0.4 nm or so. The use of this fiber grating, due to low temperature dependency and wide reflective band, enables the peak of wavelength $\lambda_b$ to always disappear in spite of ambient temperature changes. In addition, the etalon gap in the Fabry-Perot filter 320 is preferably constituted of vacuum or air, whereby the temperature dependency and dispersion effect can be reduced. Further, there is a method for maintaining the Fabry-Perot filter 320 at the predetermined temperature to obtain higher reliability. Though switching the locations of the reference fiber grating 310 and the Fabry-Perot filter 320 as shown in FIG. 7, it does not affect the object of this embodiment in the present invention.

Referring again to FIG. 5, the fiber Bragg grating array 400 receives the other light from the first coupler 210, and then reflects light of each wavelength determined by the each grating. The fiber grating wavelength sensing unit 500 detects each of the reflected lights from the fiber Bragg grating array 400, and then measures each time of the detected lights. Accordingly, the fiber grating wavelength sensing unit 500 comprises a photodetector and a circuit for measuring time of reflected peak from the detected signal at the photodetector. To measure the time of the peak in this embodiment, a method for averaging two points having a specified ratio of the reflected peak's maximum value has been used. If the time of the peak is calculated using this method, errors that may be caused by the change of laser intensity or change of the signal reflected at the fiber Bragg grating array or that may be caused by wide reflection width of the Bragg grating can be reduced.

The signal processing unit 600 respectively receives times of the detected reference wavelengths from the reference wavelength generating unit 300 and times of the detected lights from the fiber grating wavelength sensing unit 500 and figures the wavelengths in each time period of the outputted light from the wavelength tunable laser 100. It also obtains wavelengths of the detected lights from the fiber grating wavelength sensing unit 500 by comparing the wavelengths in each time period with the input times from the fiber grating wavelength sensing unit 500.

Referring to FIGS. 5 and 8, the laser wavelength control feedback unit 700 periodically changes output wavelength of the wavelength tunable laser 100 by applying AC voltage, i.e. the triangular wave to the wavelength tunable filter. It receives the information concerning the wavelength of the tunable laser in each time period from the signal processing unit 700 outputted from the wavelength tunable laser 100, and adjusts DC voltage applied to the wavelength variation filter to uniformly repeat wavelengths in each time period regardless of the ambient environmental perturbations.

To generate the triangular wave, a triangular wave generator 710 is used. Amplitude of the triangular wave determines a wavelength variation range, and the frequency thereof determines a wavelength variation speed. In an amplitude-increasing interval of the triangular wave, for example an interval increasing the laser wavelength, wavelength measurement of the grating array is performed. In an amplitude-decreasing interval, a signal processing and a laser wavelength control feedback are carried out. Even if a certain triangular wave is applied to the wavelength tunable filter as described above, it is required for the feedback capable of actively controlling the laser wavelength variations because the range of the wavelength variations is changed by temperature characteristics and hysteresis of the filter.

Besides the triangular wave for changing the wavelength, to control the laser wavelength in the present invention, DC compensation voltage determined by data of the reference wavelength generating unit and the signal processing unit has further been applied. That is, the wavelength is actively controlled applying the triangular wave and the compensation voltage for feedback to the wavelength tunable filter in order that the uniform wavelength variation is outputted regardless of environmental perturbations. The control feedback is the following.

First, in the amplitude-increasing interval, peak time ($T_1$) of an absolute reference wavelength ($\lambda_b$) among wavelengths measured from the reference wavelength generating unit 300 is measured and stored. In addition, the difference ($\Delta T$) of the setting time ($T_0$) when a user wants to locate the absolute reference wavelength and the peak time ($T_1$) of the measured absolute reference wavelength is acquired by the use of a subtracter 720. Time difference ($\Delta T$) obtained from the subtracter 720 in the current period and the time difference ($\Delta T'$) in the previous period are added at a first adder 730 and the result is used as an error signal of the feedback. Compensation voltage in proportion to the error signal is generated at a digital-analog converter 740. That is, the compensation voltage is generated to maintain time where the absolute reference wavelength is positioned. The compensation voltage is outputted in the amplitude-decreasing interval, and signals being applied to the wavelength tunable filter are generated adding the output compensation voltage and triangular wave at a second adder 750. With this method, laser wavelength can be adjusted at every period.

Comparing the above-described fiber Bragg grating sensor system according to the present invention with that of the prior art, the laser wavelength can actively be adjusted with the wavelength information as well as real-time measurement and calculation for the laser wavelength are performed.

Thus, there is an advantage of suppressing instability of laser power or wavelength induced by the environmental change and the abrupt shift of laser wavelength, which does not change monotonically, originating from the spreading of the transmission wavelength of the wavelength tunable filter out of free spectral change. That is, it is substantially effective to long-term measurement by constantly stabilizing the laser wavelength itself.

Figure 9:
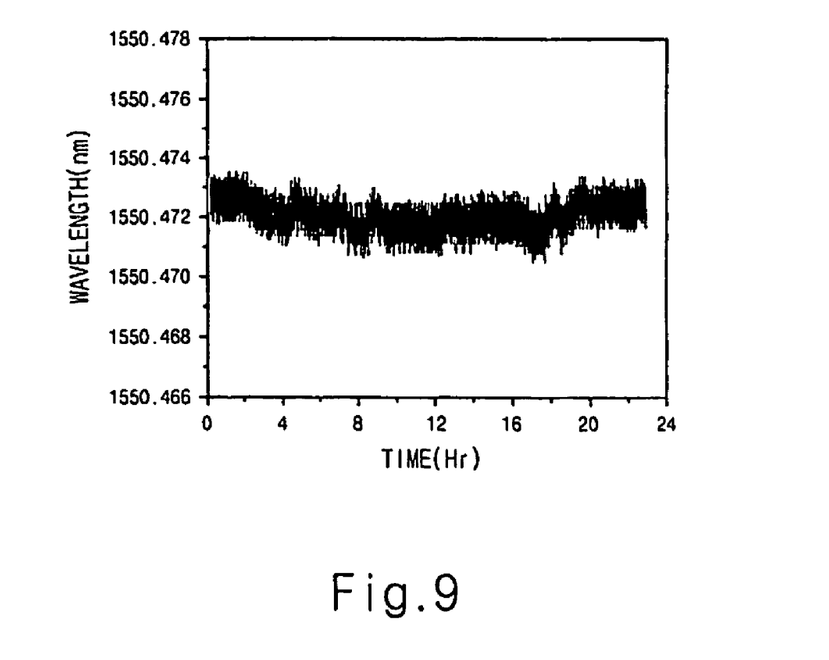

FIG. 9 shows a graph indicating the wavelength of the fiber grating measured by utilizing the fiber Bragg grating sensor system according to the above-described present invention. During measurement, the wavelength of the fiber grating has not been changed by isolating the fiber grating from the environmental perturbations.

Referring to FIG. 9, even if it has been measured longer than 22 hours, the signal has been detected stably. That is, a noise (resolution) was not greater than about 1 nm, and drift was not greater than about 3 nm. In accordance with the present invention, therefore, the fiber Bragg grating sensor system having accuracy of a few nm orders can be embodied. In addition, it is easily extended to measure several fiber grating sensor arrays by splitting the laser output because light intensity of the wavelength tunable laser in the present invention is greater than or equal to a few mW. For this extension, the second coupler 220 of FIG. 5 is substituted with a multi-channel splitter and the fiber grating wavelength sensing unit 500 is separately connected to each of the fiber grating sensor arrays. As a result, hundreds of the fiber grating sensors can be simultaneously measured.

In the followings, operation of the above-described fiber Bragg grating sensor system will now be summarized with reference to FIG. 5.

Light outputted from the wavelength tunable laser 100 are split at the first coupler 210, and then one of the lights split at the first coupler 210 is introduced to the reference wavelength generating unit 300, periodic reference wavelengths and an absolute reference wavelength are generated at the reference wavelength generating unit 300. The signal processing unit 600 receives a signal from the reference wavelength generating unit 300 and then figures the wavelengths in each time period regarding the output light from the wavelength tunable laser 100, and the laser wavelength control feedback 700 stabilizes the wavelength of the wavelength tunable laser 100 so as to maintain the uniform wavelength variation in each time period.

Moreover, the other of lights split at the first coupler 210 is reflected from the fiber Bragg grating array 400 with respect to each of wavelengths, and the fiber grating wavelength sensing unit 500 defects the time of each wavelength of the reflected lights. The time is introduced into the signal processing unit 600, changed to corresponding wavelength, and converted into a physical property to measure.

Meanwhile, the polarization dependency may be present in the fiber Bragg grating sensor system of the above-described present invention. In the following, embodiments for removing the polarization dependency will now be discussed.

Figure 10:
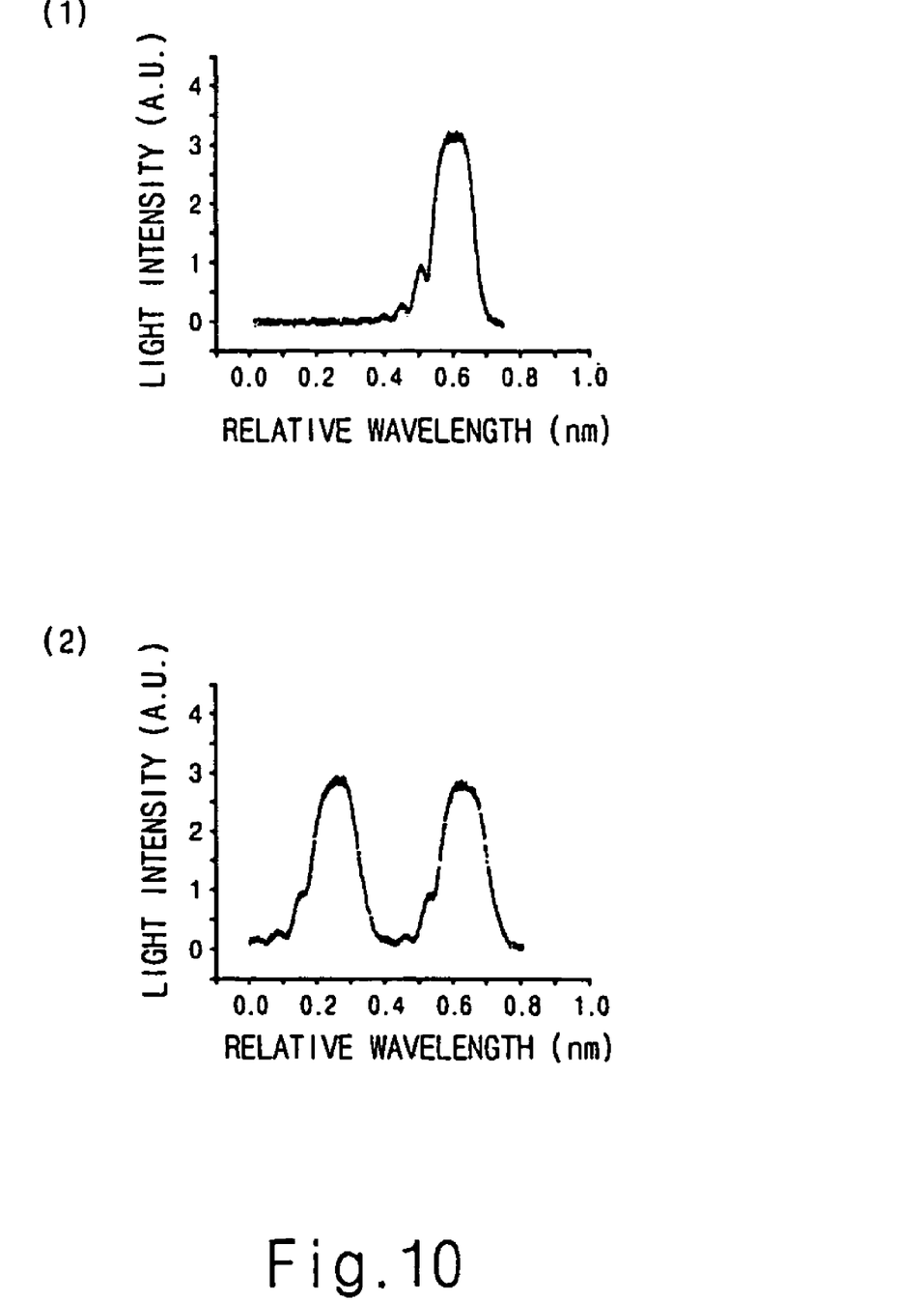

FIG. 10 shows graph of the reflected spectrum of a fiber grating when the birefringence is induced at the fiber grating by transverse stress or bending.

Referring to FIG. 10, if the transverse stress is not applied, only one peak is measured as shown in FIG. 10(1), while the peak is separated as shown in FIG. 10(2) if applied. This distortion (separation) increases errors in measuring wavelength of the grating due to the change of amplitude and shape of each reflected peak according to polarization of input light. This implies that the errors occur in measuring axial strain when undesired transverse stress is applied to the fiber grating.

In order to remove the polarization dependency, a method for depolarizing the laser output has been used in the embodiment of the present invention.

There are two methods for depolarizing the laser output. The first method is to randomly change the polarization state of the laser output in the time domain randomly and rapidly by installing a polarization scrambler at the output end of the wavelength tunable laser of FIG. 5 or 6. The error in measuring the wavelength of the fiber grating due to polarization dependency can be reduced by averaging the polarization varying light for substantial time. Disadvantages of this method are not only to use a scrambler, an active device, but also to have the limitation in wavelength measuring speed due to the limitation in the scrambling speed itself. The second method is to install a depolarizer at the output end of the wavelength tunable laser of FIG. 5 or 6. It is a method for measuring wavelength regardless of a polarization by depolarizing the laser output. Simple depolarizer is constructed by splicing two pieces of polarization maintaining fiber with the length ratio of 1 to 2 and with the angle of 45° between them. At this time, the required length of the expensive polarization maintaining fiber is inversely proportional to a wavelength linewidth of the laser output. As a result, the wavelength linewidth of the laser output should have been wide for effective use of the depolarizer.

In the above-described two methods, the method with the depolarizer is preferred. The reason is that it is the passive device, whereby it does not need to have a power supply and there is no limitation in speed. However, for the case of typical wavelength tunable lasers in the fiber Bragg grating sensor system, the wavelength linewidth is very narrow such as a few hundred kHz below. Therefore, the use of the depolarizer is not suitable for the system. Meanwhile, in case of the wavelength tunable laser applied in the present invention, a mode-locked stable light output having an instant wavelength linewidth ranging 0.1~0.5 nm can be obtained, which is not only suitable for the use of depolarizer but also providing sufficient wavelength resolution.

Although the invention has been described and illustrated with respect to the exemplary embodiments thereof, it should be understood that the fore-going and various other changes, omissions and additions may be made by a person skilled in the art without departing from the spirit and scope of the invention.

In the fiber Bragg grating sensor system according to the present invention as described above, it can not only measure and calculate real-time laser wavelengths, but also control the laser wavelength with the use of the result wavelengths, thereby improving wavelength accuracy, and the polarization dependency problem is solved, whereby the fiber Bragg grating sensor system can be used practically.

For example, it can be employed for diagnoses of large structures such as nuclear power plants, roads, bridges, and dams, and for abnormality check and structural analysis of mechanical structures such as airplanes, rocket projectiles, and satellites, and it can be applied for studying problems of new structure and conventional structure. That is, a fiber Bragg grating analysis system of the present invention is expected to replace conventional construction diagnosis sensors.

Meanwhile, there is an advantage of simultaneously measuring many fiber gratings for very high intensity of the light source in the present invention.

What is claimed is:

1. A fiber Bragg grating sensor system comprising:
a wavelength tunable laser including a wavelength tunable filter for outputting a tunable wavelength light;
a first coupler for receiving the light outputted from the wavelength tunable laser and for splitting the light into two directions;
a reference wavelength generating unit for receiving one of lights split by the first coupler, for generating reference wavelengths to measure real-time wavelengths of the light outputted from the wavelength tunable laser, and for defining one of the reference wavelengths as an absolute reference wavelength;
a fiber Bragg grating array for receiving the other of lights split by the first coupler and for reflecting the lights by each of wavelengths of the grating therein;
a fiber grating wavelength sensing unit for measuring times when each of lights reflected from the fiber Bragg grating array is detected;
a signal processing unit for receiving times of the reference wavelengths generated from the reference wavelength generating unit and times when lights are detected from the fiber grating wavelength sensing unit, for calculating wavelengths in each time period of light outputted from the wavelength tunable laser, and for calculating wavelengths of the lights detected from the fiber grating wavelength sensing unit; and
a laser wavelength control feedback unit for applying AC voltage to the wavelength tunable filter for output wavelength of the wavelength tunable laser to be periodically changed, and for receiving data of the wavelengths in each time period of the wavelength tunable filter from the signal processing unit and for applying DC voltage to the wavelength tunable filter in order that the wavelengths in each time period of the wavelength tunable filter are regularly repeated, wherein the DC voltage is applied in order to constantly maintain time when the absolute reference wavelength is located.

2. The fiber Bragg grating sensor system according to claim 1, wherein the wavelength tunable laser comprises:
a laser diode for providing pumping lights;
a wavelength-division multiplexer for injecting the light outputted from the laser diode to a gain medium;
an erbium-doped optical fiber used as a gain medium; and
a wavelength tunable filter controlled by the AC voltage for periodically scanning or tuning the laser wavelength.

3. The fiber Bragg grating sensor system according to claim 2, wherein the output of the wavelength tunable laser is mode-locked by tuning the magnitude and frequency of the AC voltage applied to the wavelength tunable filter.

4. The fiber Bragg grating sensor system according to claim 1, wherein the reference wavelength generating unit comprises:
a Fabry-Perot filter;
a reference fiber grating; and
a photodetector;
the reference wavelength generating unit characterized in that reflective wavelength of the reference fiber grating is matched with one of wavelengths transmitted through the Fabry-Perot filter thereby corresponding peak is vanished, and the following peak next to the vanished peak is used as an absolute reference wavelength.

5. The fiber Bragg grating sensor system according to claim 4, wherein the reference fiber grating is temperature-stabilization packaged and linewidth of the reflected wavelength is widely and flatly processed.

6. The fiber Bragg grating sensor system according to claim 4, wherein etalon gap of the Fabry-Perot filter consists of vacuum or air.

7. The fiber Bragg grating sensor system according to claim 4, wherein the Fabry-Perot filter is maintained at a predetermined temperature.

8. The fiber Bragg grating sensor system according to claim 1, wherein the first coupler; a plurality of the fiber Bragg grating arrays; and a plurality of the fiber grating wavelength sensing unit corresponding one by one to the fiber Bragg grating array are optically connected by a multi-channel splitter.

9. The fiber Bragg grating sensor system according to claim 1, wherein a depolarizer is further installed at an output end of the wavelength tunable laser, and the first coupler splits the light depolarized by the depolarizer into two directions.

10. The fiber Bragg grating sensor system according to claim 9, wherein the depolarizer comprises two pieces of polarization-maintaining optical fiber having a length ratio of 1:2 and spliced at the angle of about 45° between them.

11. The fiber Bragg grating sensor system according to claim 1, wherein the wavelength tunable laser further comprises a polarization scrambler at output end thereof, and the first coupler splits the light depolarized by the polarization scrambler into two directions.

* * * * *